Figure 1:
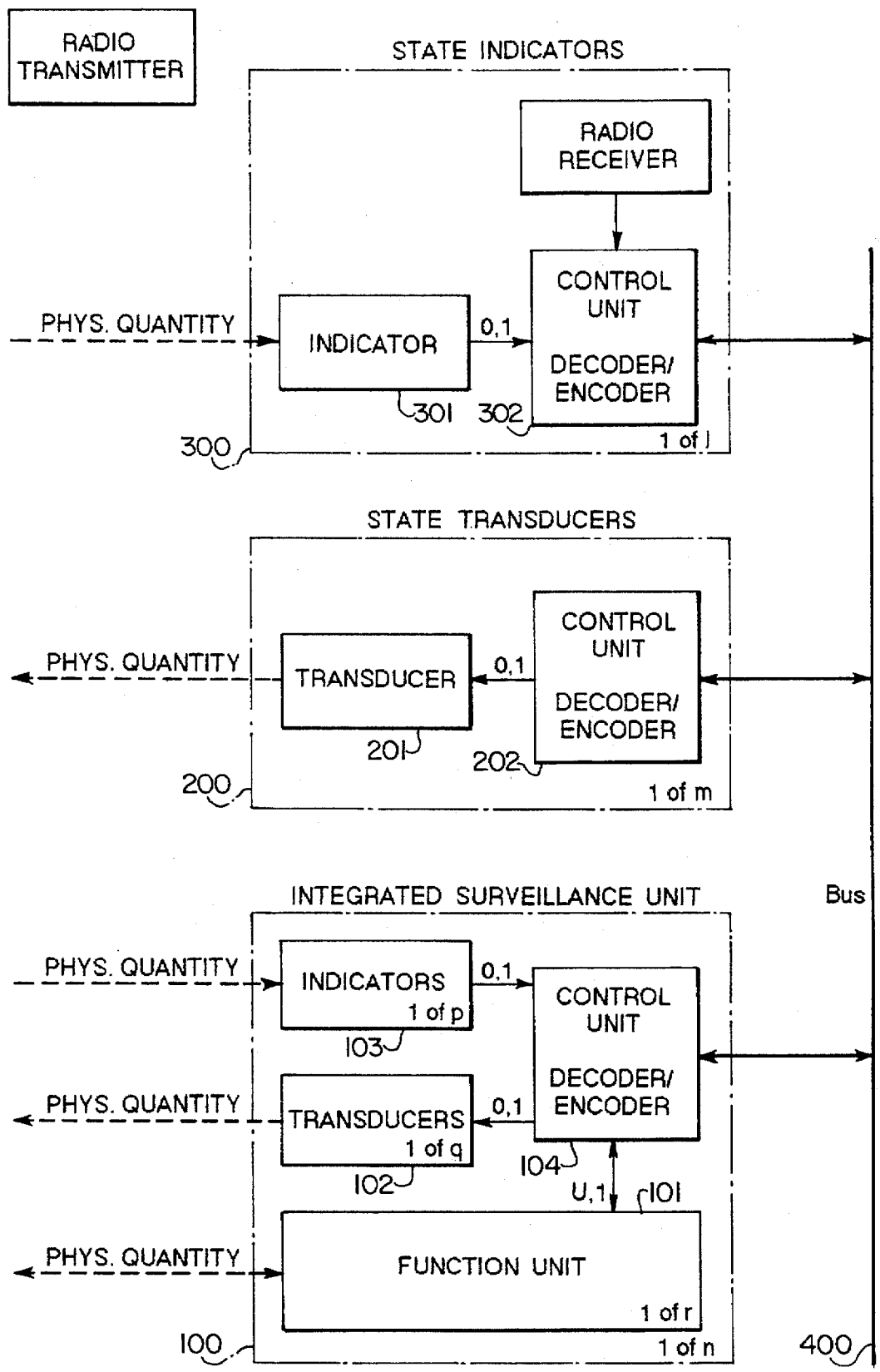

United States Patent [19]

Kaiser et al.

[11] Patent Number: 5,696,482
[45] Date of Patent: Dec. 9, 1997

[54] SAFETY SYSTEM FOR PROTECTING MOVABLE OBJECTS

[75] Inventors: Hans Christian Kaiser, Malteserstr. 13, D-71120 Grafenau; Holger Wölm, Kronau; Udo Schmitt, Freiberg IN, all of Germany

[73] Assignee: Hans Christian Kaiser, Grafenau, Germany

[21] Appl. No.: 492,090

[22] PCT Filed: Jan. 20, 1994

[86] PCT No.: PCT/EP94/00142

§ 371 Date: Sep. 22, 1995

§ 102(e) Date: Sep. 22, 1995

[87] PCT Pub. No.: WO94/16923

PCT Pub. Date: Aug. 4, 1994

[30] Foreign Application Priority Data

Jan. 20, 1993 [DE] Germany ............... 43 01 436.4

[51] Int. Cl.⁶ .................... B60R 25/10; B60R 25/00
[52] U.S. Cl. ............... 340/426; 350/428; 350/825.31; 307/10.2; 307/10.6; 180/287
[58] Field of Search .................... 340/426, 428, 340/438, 439, 825.31, 825.72; 307/10.2–10.5; 180/287

[56] References Cited

U.S. PATENT DOCUMENTS

| | | | |
|---|---|---|---|
| 4,380,225 | 4/1983 | Wedemeyer et al. | 123/613 |
| 4,777,468 | 10/1988 | Eustache et al. | 340/428 |
| 4,888,575 | 12/1989 | De Vaulx | 340/426 |
| 4,940,964 | 7/1990 | Dao | 340/438 |
| 5,006,843 | 4/1991 | Hauer | 340/825.31 |
| 5,023,591 | 6/1991 | Edwards | 340/426 |
| 5,091,856 | 2/1992 | Hasegawa et al. | 180/287 |
| 5,365,225 | 11/1994 | Bachuber | 340/825.31 |
| 5,418,519 | 5/1995 | Hino et al. | 340/426 |
| 5,481,253 | 1/1996 | Phelan et al. | 307/10.2 |
| 5,514,914 | 5/1996 | Sellem et al. | 307/10.5 |
| 5,521,443 | 5/1996 | Imura et al. | 307/10.2 |
| 5,535,844 | 7/1996 | Samford | 307/10.2 |

FOREIGN PATENT DOCUMENTS

| | | | |
|---|---|---|---|
| 225492 | 6/1987 | European Pat. Off. | B60R 25/10 |
| 268902 | 6/1988 | European Pat. Off. | G08C 19/28 |
| 292759 | 11/1988 | European Pat. Off. | B60R 25/00 |
| 308988 | 3/1989 | European Pat. Off. | B60R 25/04 |
| 3507593 | 9/1986 | Germany | B60R 25/00 |
| 3545575 | 7/1987 | Germany | B60R 25/10 |
| 3613605 | 11/1987 | Germany | B60R 25/04 |
| 3715631 | 11/1988 | Germany | G28B 13/22 |
| 3739670 | 8/1989 | Germany | G28B 13/00 |

*Primary Examiner*—Brent A. Swarthout
*Assistant Examiner*—Van T. Trieu
*Attorney, Agent, or Firm*—Reid & Priest LLP

[57] ABSTRACT

A safety system for protecting movable objects such as alarm systems of motor vehicles, although the same basic ideas can be applied for example to cases, computers and the like, which are to be protected from an unauthorized use or removal. Particularly, the safety system for the vehicle comprising state indicators may for door contacts, oil pressure pick ups, temperature pick ups and the like; and state transducers may for control lighting means, starter, and the like. Both the state indicators and state transducers are continuously emitting code signals to identify themselves to the primary control unit and second control unit via the common information transmission channel. The primary control unit for storing information on the correct form of the code signals of a first predetermined number of the other state indicators and state transducers, while the second control unit for storing information on the correct form of the code signals of a second predetermined number of the other state indicators and state transducers, wherein at least one of state indicators and state transducers perform its intended function only when the code signals received from the other state indicators and state transducers and the primary control unit is in the correct form.

21 Claims, 2 Drawing Sheets

SAFETY SYSTEM FOR PROTECTING MOVABLE OBJECTS

The invention relates to a safety system of the type set forth below.

Safety systems for protecting movable objects are known in a variety of forms. Typical examples of them are alarm systems of motor vehicles, although the same basic ideas can be applied for example to cases, computers and the like which are to be protected from unauthorized use or removal. It is known that such safety systems can be put out of operation or rendered inoperative by experienced persons within a relatively short time, for example by overbridging and/or removal of ignition locks and/or alarm contacts.

The invention is based on the problem of providing a safety system of the type mentioned at the beginning which provides substantially greater safety against unauthorized use or removal of an object, the intended function of the object to be protected no longer being possible when one or more of the safety elements of the safety system is destroyed or rendered inoperative.

This problem is solved by the features set forth in the characterising clause of claim 1.

Advantageous embodiments and further developments of the invention will be apparent from the subsidiary claims.

With the configuration of the safety system according to the invention it is not possible to put said system out of operation by bridging one of the Safety elements, for example in the form of a state indicator and/or state transducer, because in this case not all the code signals are then properly transmitted via the common information transmission channel. The at least one surveillance unit and/or at least some of the state indicators and state transducers contain control units in which information is stored on all or at least a predetermined number of the code signals used in the system and which monitor the code signals transmitted via the common information transmission channel, the function indicated or controlled by the respective control unit being blocked when not all or not the number of code signals assigned to said control unit are present in the system.

For explanation reference will be made to the example of motor vehicles in which the at least one surveillance unit contains for example the central control unit for the engine functions in such a manner that said surveillance unit cannot be separated from the control unit without destroying all the functions.

Respective code signals are assigned to this at least one surveillance unit and the individual state transducers and indicators and the exchange of one of these elements leads to a "foreign" code signal or even no code signal at all being introduced into the system, this leading immediately to failure of the surveillance units and/or the state indicators and transducers which likewise contain control units monitoring the safety system for correct presence of the code signals.

Since the encoders and decoders of the state indicators and state transducers can be constructed very simply by using integrated circuits, such state indicators may for example be door contacts, oil pressure pickups, temperature pickups and the like, so that a large number of such state indicators can be distributed in the safety system without high cost expenditure. The same applies to the state transducers which may for example control lighting means, starters and the like.

Due to the fact that a control unit in which information on a further predetermined number of code signals is stored is likewise associated with at least one further state indicator or state transducer, the unauthorized use of the protected object by exchanging a surveillance unit is prevented. The state indicators and transducers provided with control units may be distributed in relatively random manner, which can easily be changed from one object to another, in the object, and this makes removal of the individual modules of the safety system extremely difficult, if not impossible.

Since a plurality of different code signals can be assigned to each of said state indicators and transducers and these signals are practically impossible to determine or are only emitted when all the other components of the system have emitted the correct code signals, in practice it is possible only with unacceptable expense and effort to render the safety system inoperative by replacing both the surveillance units as well as all the state indicators and state transducers by uncoded corresponding components. The individual state indicators and state transducers may likewise preferably be connected to the aggregates controlled by them or the aggregates from which they receive signals in such a manner that they can be separated therefrom only by destruction.

The common information transmission channel may for example be a simple bus bar or a glassfibre network or the like, and this information transmission channel may be independent from the usual wiring, for example of a vehicle, or form part thereof if said wiring consists in any case at least partially of a signal bus bar, the use of which is in any case becoming increasingly popular to save complicated wiring in motor vehicles.

According to a preferred embodiment of the invention the code signal at least of one of the state indicators or transducers may be variable by external action, for example a radio signal. Here, radio signals of already existing radio networks with wide distribution, for example eurosignal networks, may be used in correspondingly coded and protected coding.

The same safety measures are of course adopted for the radio signal receivers used in this case, i.e. they cannot be separated without destruction from the associated state indicators or transducers and when impaired, for example on removal of their antenna, they emit an error code signal.

If the individual control units each monitor different groups of code signals, it is possible to combine these code signals in dependence upon specific priorities to a respective number of code signals in such a manner that absence of a code signal of one of said numbers has consequences other than the failure of a code signal of another number of said code signals. Thus, for example, the aforementioned external action in the case of a vehicle may result in immediate complete or extensive power drop of the driving engine when the code signal of the corresponding receiver is monitored in the control unit associated with the engine control of the vehicle, whilst other defective or absent code signals are grouped in another number of code signals and block only the switching on again of a component of the vehicle, for example the lighting or the starter, or permit this switching on only a limited number of further times so that emergency operation is possible on failure of components not absolutely essential to the function.

Examples of embodiment of the invention will be explained in detail hereinafter with reference to the drawings.

Figure 2:
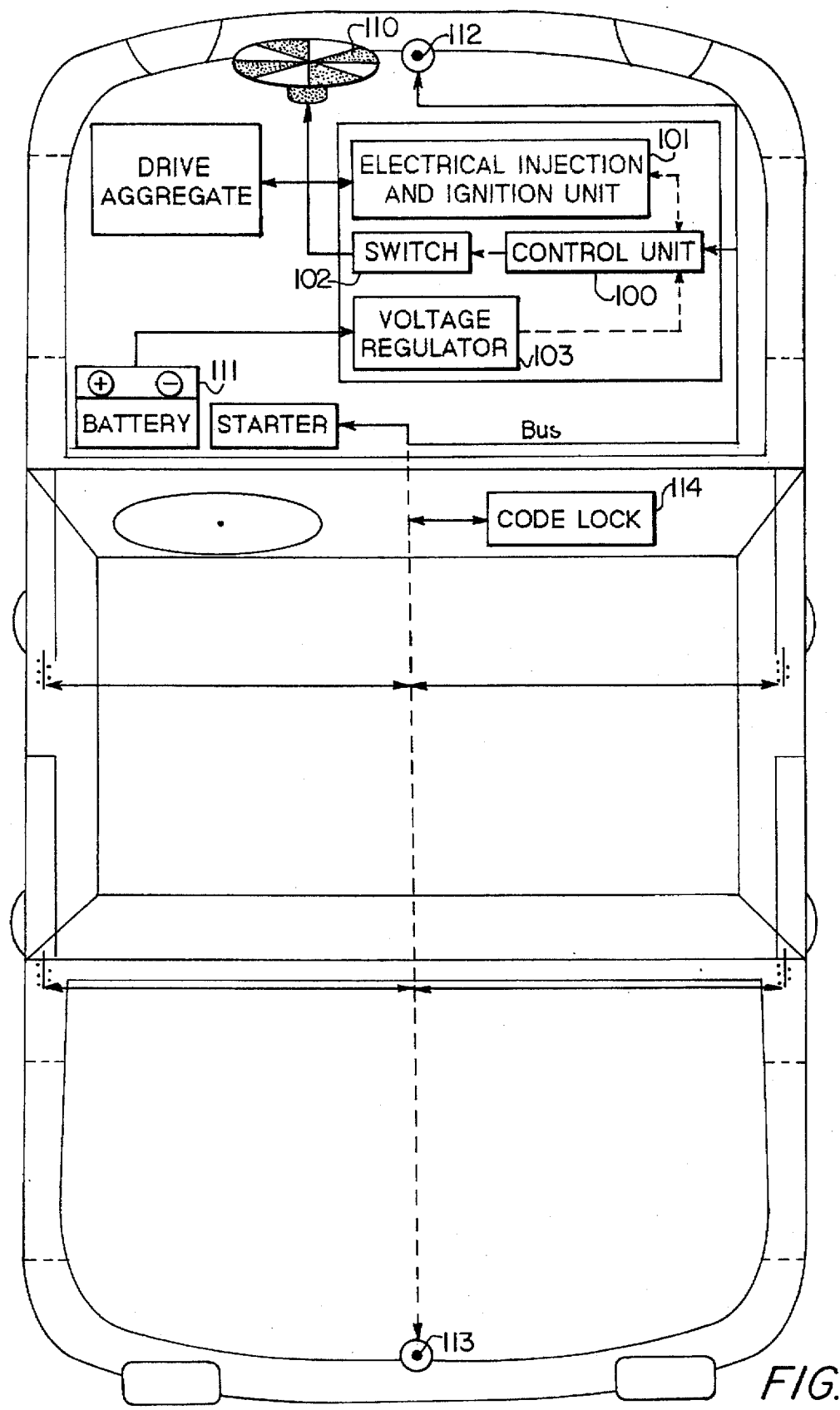

In the drawings:

FIG. 1 shows a block circuit diagram of an example for the configuration and connection of the components of the safety system, FIG. 2 shows an example for the use of the safety system in a motor vehicle.

In FIG. 1 a block circuit diagram is shown which illustrates the fundamental ideas of the safety system. This safety system comprises an integrated surveillance unit 100 which has a function unit 101 absolutely essential to the function of the object protected by the safety system. Said function unit 101 is controlled by a control unit 104 which is connected to a common information transmission channel 400, for example in the form of a bus bar or a glassfibre transmission channel. State transducers 200 and state indicators 300 are also connected to said common information transmission channel 400. The connection of the surveillance unit and the state transducers and state indicators to the common information transmission channel is via decoders and encoders 202 and 302 and decoders and encoders arranged in the control unit 104. Each encoder furnishes either continuously or on request code signals to the information transmission channel 400, said code signals identifying the respective surveillance unit or the state transducer or state indicator.

The surveillance unit 100 and at least one, preferably however several, of the state transducers 200 and state indicators 300 contain control units which store information on the correct form of all or a respective predetermined number of the code signals of the individual units employed in the safety system and compare the information on said code signals with the code signals occurring on the information transmission channel, the function of said surveillance unit, the respective state transducers and state indicators being possible only when the predetermined code signals of the safety system are correctly received.

This means that when for example one of the state transducers 200 or state indicators 300 is removed from the system all the component units monitoring the code signals of said state transducer or state indicator can no longer fulfil their function. Apart from the encoders and decoders 202 the state transducers 200 may comprise transducers 201 which are driven in dependence upon control signals emitted via the common information transmission channel and decoded by the associated decoder and change the control of a physical quantity, such as current, voltage, mechanical, force or state.

In the same manner the state indicators 300 may have a decoder-encoder 302 which passes output signals from an indicator 301 for physical quantities such as current, voltage, temperature, light, noise, mechanical changes, to the encoder, whereupon the latter emits a corresponding signal via the common information transmission channel. Corresponding indicators 103 and transducers 102 may likewise form part of the integrated surveillance unit.

These corresponding decoders-encoders may further form part of the control units if such a unit is associated with the state transducer or state indicator.

FIG. 2 shows an example of the application of the basic ideas explained with reference to FIG. 1 to a motor vehicle.

Said motor vehicle comprises an electrical injection and ignition unit 101 which controls a drive aggregate, for example an internal-combustion engine. Said injection and ignition unit 101 forms part of the surveillance unit 100, the control unit of which is connected to the common information transmisson channel. The surveillance unit 100 further comprises transducers 102, for example in the form of a switch for a fanwheel 110, and a state indicator, for example in the form of a voltage regulator 103 for a battery 111. The common information transmission channel is further connected to engine bonnet or boot lid switches 112 and 113 representing state indicators in the sense of the block circuit diagram of FIG. 1.

Further state indicators connected to the common information transmission channel 400 may be sensors for temperature, oil pressure and the like of the drive aggregate.

A further state indicator may be formed by the ignition lock or for example a code lock 114. According to a preferred embodiment one of the state indicators or state transducers may be influenceable by an external signal, for example by a radio signal, by which at least the code identifying this state transducer or state indicator may be changed so that all the component units monitoring the code signals of the safety system block their function. It is possible in this manner for example when a vehicle is stolen to change the code signal of one of the component units by an external radio signal with the result that the entire vehicle becomes inoperable and can practically be started again only from a point where information is available on all the code signals used in the specific vehicle. The same applies to the case in which any one of the modules, for example a door contact, is bridged or exchanged. Since this replacement part or the bridged part no longer furnishes the correct code the entire vehicle is inoperable. Components provided with a coding can be obtained and/or installed only by authorized persons and consequently this makes unauthorized operation of the vehicle impossible.

The state transducers thus described are all transducers which are in any case present in an object to be protected, for example a vehicle. The safety system may however also include additional transducers, for example mechanical transmission or engine blocking means which are arranged at difficultly accessible points and have the same safety features as the state transducers described above.

Although above a preferred example of the safety system has been described with reference to a vehicle, application of the safety system to other objects is conceivable. For example, a computer may be provided with a code lock furnishing a corresponding code signal in the manner of one of the state indicators or state transducers according to FIG. 1. An integrated surveillance unit may include the main circuit board of the computer whilst the remaining functional units of the computer, for example magnetic drives, interface circuits, monitors and the like may form state indicators and/or state transducers according to FIG. 1. Unless all the code signals provided in the system are correctly generated function of the overall system is not possible even when some of the modules referred to above are replaced. All the component units or modules form an overall system with predetermined code signals for each module, of which each one is ineffective when the other predetermined modules with associated code signals are not contained in the overall system.

We claim:

1. A safety system for protecting a vehicle from unauthorized use or removal, comprising:
   a plurality of state indicators for measuring physical quantities, said state indicators emitting code signals to identify themselves;
   a plurality of state transducers for controlling physical quantities, said state transducers emitting code signals to identify themselves;
   a bi-directional, common information transmission channel to which said state indicators and said state transducers are connected;
   an integrated surveillance unit including:
      a function unit absolutely essential to the function of the vehicle, said function unit being inseparable from said integrated surveillance unit without destruction of said function unit; and a primary control unit which controls at least said function unit, said primary control unit including means for storing information on the correct form of the code signals of a first predetermined number of said state indicators and said state transducers and for comparing the code signals received from said state indicators and said state transducers over said channel with the stored information, said primary control unit bring connected with and receiving the code signals form said plurality of state indicators and said plurality of state transducers via said common information transmission channel, said primary control unit blocking the function of said function unit when said primary control unit does not receive the code signals in the correct form for all of said first predetermined number of said state indicators and said state transducers; and wherein said state indicators and said state transducers are distributed in a substantially random manner over the entire vehicle and wherein at least one of said indicators and said state transducers includes a secondary control unit for storing information on the correct form of the code signals of a second predetermined number of the other of said state indicators and said state transducers and said primary control unit and for comparing the code signals received from said second predetermined number of the other of said state indicators and said state transducers and said primary control unit over said channel with the stored information, said at least one of said state indicators and said state transducers performing its intended function only when the code signals received from the other of said state indicators and said state transducers and said primary control unit are in the correct form for all of said second predetermined number of the other of said state indicators and said state transducers.

2. The safety system of claim 1, wherein said state indicators and said state transducers emit the code signals continuously.

3. The safety system of claim 1, wherein said state indicators and said state transducers emit the code signals on request.

4. The safety system of claim 1, wherein said means for monitoring monitors the code signals continuously.

5. The safety system of claim 1, wherein said means for monitoring monitors the code signals on request.

6. The safety system of claim 1, wherein the number of code signals monitored by one of said primary and secondary control units and the timing of the monitoring depend on the operating state of the vehicle.

7. The safety system of claim 6, wherein each of said primary and secondary control units includes means for transmitting an error code signal to said channel when it does not correctly receive all the code signals of said first and second predetermined number of code signals, respectively; and wherein each of said primary and secondary control units, said state indicators, and said state transducers include means for evaluating the error code signal.

8. The safety system of claim, 6, wherein said surveillance unit includes state indicators and state transducers which cannot be separated therefrom without destruction.

9. The safety system of claim 1, wherein each of said primary and secondary control units includes means for transmitting an error code signal to said channel when it does not correctly receive all the code signals of said first and second predetermined number of code signals, respectively; and wherein each of said primary and secondary control units, said state indicators, and said state transducers include means for evaluating the error code signal.

10. The safety system of claim 9, wherein said surveillance unit includes state indicators and state transducers which cannot be separated therefrom without destruction.

11. The safety system of claim 1, wherein said surveillance unit includes state indicators and state transducers which cannot be separated therefrom without destruction.

12. The safety system of claim 1, further including an ignition lock, motion indicators, door contacts, and sensors for physical quantities of the drive unit, and wherein said state indicators and said secondary control units included therein form elements, inseparable without destruction, of said ignition lock, said motion indicators, said door contacts, and said sensors for physical quantities of the drive unit.

13. The safety system of claim 12, further including a starter motor, actuating switches for lights, the vehicle ignition, and injectors, wherein said state transducers control said starter motor, said actuating switches, said vehicle ignition, and said injectors.

14. The safety system of claim 13, wherein said state transducers cannot be separated from said starter motor, said actuating switches, said vehicle ignition, and said injectors.

15. The safety system of claim 1, wherein said function unit is the injection and ignition unit of the vehicle.

16. The safety system of claim 1, further comprising means for changing the code signal of at least one of said state indicators, said state transducers, and said primary control unit by external action.

17. The safety system of claim 16, wherein the external action is the sending of a radio signal, and wherein said means for changing the code signal of an already existing radio network with at least a country-wide distribution, only if the vehicle is stolen, comprises a radio receiver connected to at least one of said state indicators and said state transducers so as to be inseparable therefrom without destruction, said radio receiver including means for initiating the emission of an error code signal to said channel whereby the function of all of said state indicators and said state transducers to which said channel is connected is impaired.

18. The safety system of claim 1, wherein said channel is an optical transmission channel.

19. The safety system of claim 1, further including an ignition lock, motion indicators, door contacts, and sensors for physical quantities of the drive unit, and wherein said secondary control units included therein form elements, inseparable without destruction of said ignition lock, said motion indicators, said door contacts, and said sensors for physical quantities of the drive unit.

20. The safety system of claim 19, further including a starter motor, actuating switches for lights, the vehicle ignition, and injectors, wherein said state transducers control said starter motor, actuating switches for lights, said vehicle ignition, and said injectors.

21. The safety system of claim 20, wherein said state transducers cannot be separated from said starter motor, said actuating switches, said vehicle ignition, and said injectors.

* * * * *